Patented July 15, 1924.

1,501,101

UNITED STATES PATENT OFFICE.

FRED T. DOW, OF BANGOR, MAINE.

PROCESS OF MAKING PEAT BRIQUETTES.

No Drawing. Application filed March 27, 1919. Serial No. 285,578.

*To all whom it may concern:*

Be it known that I, FRED T. Dow, a citizen of the United States, residing at Bangor, county of Penobscot, State of Maine, have invented an Improvement in Processes of Making Peat Briquettes, of which the following description is a specification.

This invention relates to an improved peat product in the form of cakes or briquettes which hold their shape by virtue of a binding ingredient which is one of the constituents of the peat itself, and also to an improved process by which the briquette or cake can be made.

So far as I am aware it has been heretofore customary to add some binding material to the peat before the briquetting step so as to provide the peat mass with sufficient binder to cause the particles to adhere after they have been pressed into the desired form. I have discovered that the peat product contains as one of its constituents a binder material which is capable of holding the particles together after they are pressed into briquette or cake form, provided the peat is properly treated before and during the briquetting or caking operation to render the binding ingredient operative to perform its binding function.

Accordingly my invention has for its object to provide a novel process of treating peat by which this natural binding ingredient of the peat is made available to bind the particles of peat together during the briquetting or caking process so that by means of my invention a peat briquette or cake can be made without adding to the peat any binding material which is hard and tough and can be handled without danger of its becoming crumbled or broken.

In carrying out my improved process I first remove the water from the peat either by drying the same or by expressing the water therefrom, and after the water has been removed from the peat it is treated so that the natural binding ingredient contained in the peat as it is removed from the bog is made available to perform the binding function during the pressing operation.

One way in which this natural binding agent can be made available is by heating the peat to a temperature at which the binding ingredient becomes softened and assumes a tacky nature. While the peat is in this condition it is pressed into the desired shape under heavy pressure. I find it is an advantage to subject each briquette or cake as it is formed to pressure for a considerable interval of time and to maintain the peat hot during the pressure, for by so doing the natural binding agency in the peat becomes fully available to perform its binding function. A briquette or cake of peat which is thus made by maintaining the pressure for an appreciable length of time and subjecting the peat to heat during the continuance of the pressure will be hard and tough and can be handled freely without crumbling or breaking.

I have stated above that the water is removed from the peat before it is treated so as to render the natural binding ingredient thereof available for use as a binding agent, and while, so far as the invention is concerned, the water might be removed by any suitable means, I prefer to do this by a drying process and I have secured excellent results by drying the peat through the agency of a vacuum drying process. Where the water is removed in this way the peat is first ground so as to produce a homogeneous mass and then is formed into relatively small pieces which may vary in size, after which the peat is passed through a drying chamber in which it is subjected to the action of a drying current of air at a pressure less than atmospheric pressure. Owing to the reduced pressure the water in the peat will evaporate at a temperature considerably less than 212° F. and, therefore, the drying operation is carried on expeditiously. The peat which has thus been treated to remove the water therefrom may then be transferred to an oven or retort in which it is heated to a temperature at which the natural binding ingredient in the peat becomes softened or of a tacky nature. When in this heated condition the peat is pressed into briquette or cake form and the pressure is maintained for an appreciable interval of time. I also preferably subject the peat to the action of heat during the entire time that it is under pressure, and I have found that by so doing the natural binding ingredient of the peat has time to become fully effective as a binder to hold the particles of peat together so that the briquette or cake which is thus formed will be hard and tough and can be handled without danger of crumbling or breaking.

The shape into which the completed peat product is pressed is immaterial to the invention and I may make the product either into small cakes of briquette form or into larger cakes which may have the form of slabs or sticks of wood.

While I preferably use heat for the purpose of rendering available the natural binding ingredient in the peat, yet under some circumstances, this may not be necessary as the desired end can be accomplished by the use of pressure alone if the pressure is of the right amount and of sufficient duration. However, I would prefer to use heat for this purpose.

I claim:

The process of producing peat briquettes which consists in grinding or macerating undried peat and forming while still moist into relatively small pieces or fragments, drying the peat in its fragmentary form to remove the water therefrom, heating the dried peat in such fragmentary form to a temperature sufficient to cause the binding ingredient in the peat to become available for binding purposes and then pressing the heated peat while in such fragmentary form into briquettes of the desired size and maintaining the heat and pressure for an appreciable length of time.

In testimony whereof I have signed my name to this specification.

FRED T. DOW.